Sept. 28, 1937.   E. J. LATTNER   2,094,457
FUEL LINE VIBRATION DAMPENER
Filed May 4, 1936

INVENTOR.
EMERT J. LATTNER
BY
Flournoy Corey
ATTORNEY.

Patented Sept. 28, 1937

2,094,457

UNITED STATES PATENT OFFICE 2,094,457

FUEL LINE VIBRATION DAMPENER

Emert J. Lattner, Cedar Rapids, Iowa

Application May 4, 1936, Serial No. 77,779

3 Claims. (Cl. 137—78)

This invention relates to oil burners and the like and has particular relation to means for preventing the setting up of periodic vibrations in the fuel supply tanks and fuel supply lines of such burners.

It has been noted, in some oil burner installations, that objectionable high pitch sound or noise may emanate from the supply tank utilized in storing the supply of oil for the burner. I have discovered that such noises emanating from the tank are caused by minute high frequency vibrations of the walls of the tank and that such vibrations are caused by the burner setting up low amplitude relatively high frequency pulsations in the supply line, the vibration from the burner being directed and carried back to the tank by the column of oil in these parts. It is probable that these pulsations in the fuel columns are caused primarily by the teeth of the gear pump ordinarily used in oil burners of this character. At any rate, whatever the cause, it has been determined that pulsations thus set up in the supply line and in the fuel columns cause vibration in the lines and storage tanks.

It has been proposed that metallic bellows be connected in the supply line with the idea that the bellows will expand and contract very slightly to absorb the pulsation. Such bellows have been connected to offshoot connections from the supply line or even in the supply line itself but upon consideration it is apparent that such devices in the first place are not flexible enough to completely absorb the pulsations and that, secondly, they are likely to spring leaks and permit the escape of fuel through the bellows. The fire underwriters' organizations have recognized the danger of such conditions and prohibit the use of any device in the fuel line which may permit the leakage of oil.

I have, however, devised an entirely responsive means for absorbing pulsations in the supply line, which means are so constructed that even if break-down occurs, there will be no leakage of fuel from the pulsation absorbing device.

It is a general object of my invention to provide means for preventing emanation of sound from the supply tanks and supply lines of oil burner systems.

It is a more particular object of my invention to provide means for absorbing pulsations which may be transmitted to the supply line of oil burner installations.

Another object of my invention is to provide a device of the above character which may be readily incorporated in the conventional strainer, pump, and control valve units of an oil burner structure.

A feature of my invention is that even if the device breaks down in use, no leakage of fuel will occur.

Other and further features and objects of the invention will be more apparent to those skilled in the art upon a consideration of the accompanying drawing and following specifications, wherein is disclosed a single exemplary embodiment of the invention, with the understanding, however, that such changes may be made therein as fall within the scope of the appended claims, without departing from the spirit of the invention.

Figure 1:
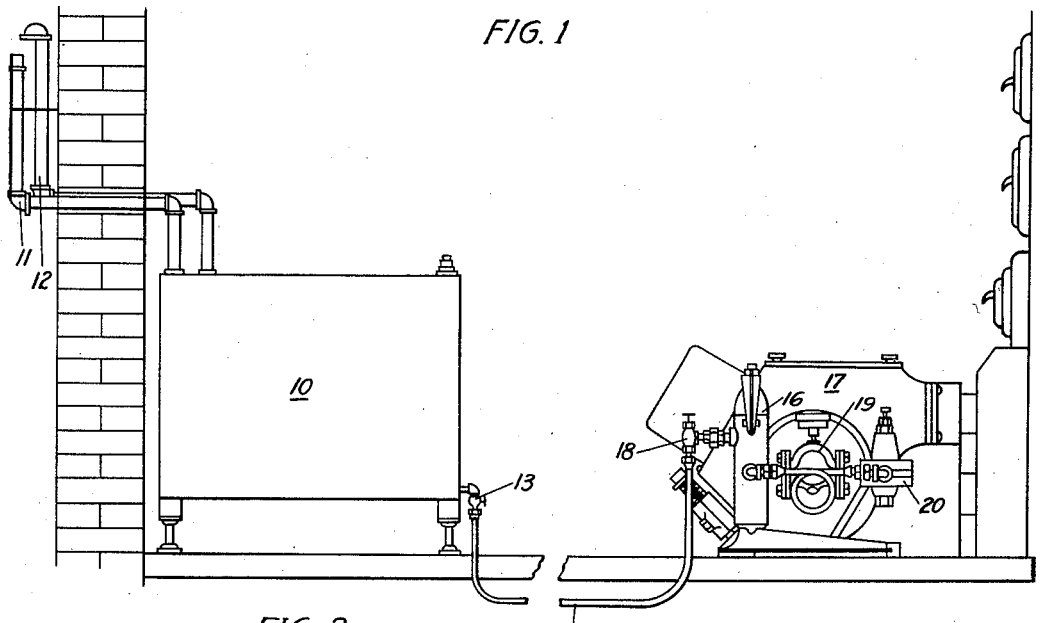
Figure 1 is a view in side elevation of an oil burner installation in which a pulsation absorbing means, constructed according to one embodiment of my invention, has been incorporated.
Figure 3:
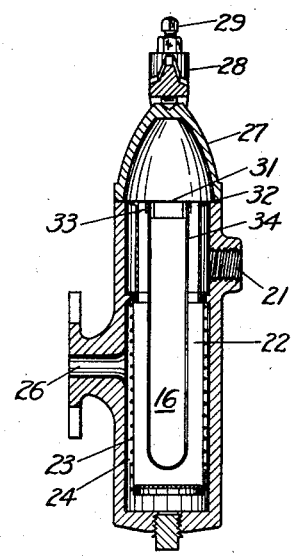
Figure 3 is a view in section of a device constructed according to another embodiment of my invention and which is adapted to be incorporated into the strainer assembly of an oil burner.

Referring now to the drawing and more particularly to Figures 1 and 3 thereof, there is illustrated at 10, generally, a fuel supply tank having a filling pipe 11 and vent 12 in accordance with the usual construction.

A fuel supply line 14 is provided and the flow of fuel into this line is controlled by the shut-off valve 13 at the supply tank 10. In operation the fuel passes from the tank 10 through the valve 13 and supply line 14 and into the strainer 16 at the oil burner 17 passing through the shut-off valve 18. The fuel flows from the strainer 16 into the pump 19 and is there pumped under pressure to the dual control valve 20 and into the nozzle (not shown) of the oil burner 17.

It is apparent that when the burner is in operation a column of fuel extends from the supply in the tank 10 through the supply line 14 into the strainer and through the pump 19 and it is believed that minute pulsations of this fuel column are set up by the teeth of the pump as they mesh together in rotation. Whatever the cause of the pulsations, however, I have devised a means which operates very satisfactorily to absorb these pulsations in the fuel supply column and in which the escape of fuel from the supply line will not occur even if the vibration damping device becomes inoperative or leaks.

A vibration damping device, constructed according to one embodiment of my invention, may be placed in the strainer 16 as illustrated in Figure 3. Fuel passes into the strainer 16 through the inlet port 21 and into the central portion 22 of the strainer chamber, then passes downward into the lower portion of this chamber and through the screen 23, and into the space 24 outside this screen. The fuel passes out through the outlet port 26 and from there into the pump 19. The upper portion 27 of the strainer 17 is merely a cap and the U-shaped member 28 is a yoke means provided with a bolt 29 for clamping the cap in place on the main body of the strainer.

A device constructed according to one embodiment of my invention includes the disk 31 which fits on the upper edge 32 of the main body of the strainer 16 and which is held in this position by the cap 27. The disk 31 is provided with a centrally disposed depending clamping support member 33 preferably in the shape of a ring as indicated. The pulsation absorbing member is a cylindrical sac 34 closed at its lower end. This sac is preferably made of rubber which has been treated to resist the effect of the fuel oil, or the sac may be made of any other suitable material such as leather, gold beater's skin or the like. The sac is held in place by any suitable means such as the clamping ring 33.

When starting up the oil burner the strainer 16 is empty at first and after the burner is started fuel begins to flow through the inlet and into the chamber 22 around the sac and then out through the outlet 26. The sac may collapse to a certain extent but it is apparent that the entrapped air within the sac will hold it in an extended position. Any pulsations set up in the fuel column, either by the pump or any other device or part of the oil burner, is absorbed by the damping means 34, by reason of the sac collapsing slightly with compressive pulsations and distending with release of pressure.

Obviously my device may be employed at any other point in the fuel line by merely providing a container and placing the sac in the container in such manner that the fuel passing through the container surrounds the sac.

Figure 2:
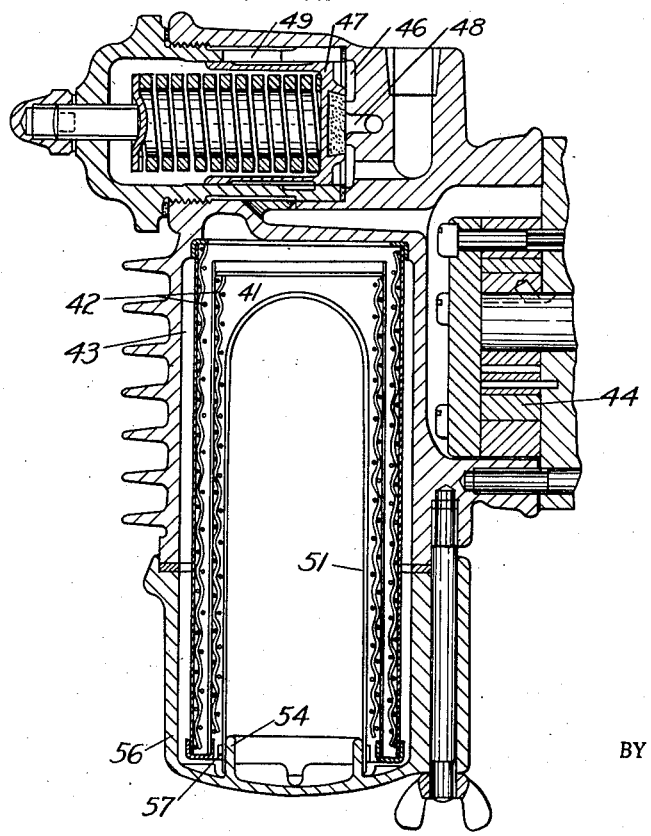
Figure 2 is a view in section showing a device, constructed according to another embodiment of my invention, that is incorporated in a conventional pump unit of an oil burner.

My damping means may be incorporated in the combination strainer, pump, and control valve mechanism illustrated in Figure 2. In this device fuel flows into the chamber 41, passes through the screen 42, and into the chamber 43. From the chamber 43 the fuel passes into the pump 44 and is discharged from the pump into the space 46 beneath the valve 47 and from there passes either to the nozzle supply line 48 or into the by-pass conduit 49. The vibration damping means 51 comprises a sac placed in inverted position from that shown in Figure 3, the sac 51 being engaged on the ring-like upwardly projecting portion 54 of the bottom member 56 of the strainer. The sac 51 is engaged on the ring 54 by means of a clamping ring 57 or in any other suitable manner. The sac 51 is filled with air preferably at atmospheric pressure and when fuel fills the chamber 41, the pulsations in the fuel supply line are absorbed by the sac.

It is apparent that the pulsation absorbing means here illustrated is effective to absorb vibrations in the fuel supply line and thus, the pulsations which tend to set up vibrations in the tank 10 are absorbed, thereby removing the cause of vibrations in the tank.

It is apparent that modifications of my invention may be made by those skilled in the art. Such modifications may be made without departing from the spirit and scope of my invention as set forth in the appended claims.

I claim as my invention:

1. In a fuel supply system for an oil burner, a fuel oil strainer, a cap member on the strainer, the strainer having a fuel oil chamber therein, a plate member secured between the cap member and fuel chamber, and a gas filled resilient sac member secured to the plate and depending therefrom in the extended position in the fuel oil chamber.

2. In a fuel supply system for an oil burner, a fuel strainer assembly comprising a strainer chamber and a cap and plate member on the strainer chamber, a gas filled resilient sac-like member secured to the cap and plate member and depending therefrom in extended position within the strainer, the said sac-like member being adapted to absorb pulsations set up in the fuel supply system.

3. In a fuel supply system for an oil burner, a fuel strainer having a main strainer chamber and including a cap and plate member on the main chamber and secured thereto, a resilient gas-filled sac secured to the cap and plate member and extending into the main strainer chamber, the sac being adapted to absorb pulsations set up in the fuel supply system by reason of the sac collapsing slightly under compressive pulsation and distending slightly under an expansive pulsation.

EMERT J. LATTNER.